(12) United States Patent
Andreas et al.

(10) Patent No.: US 10,578,223 B2
(45) Date of Patent: Mar. 3, 2020

(54) HIGH PRESSURE VALVE WITH TELESCOPIC PISTON

(71) Applicant: Luxembourg Patent Company S.A., Lintgen (LU)

(72) Inventors: Thomas Andreas, Temmels (DE); Stephan Sellen, Wehingen (DE); Philippe Schmitz, Steinsel (LU)

(73) Assignee: LUXEMBOURG PATENT COMPANY S.A., Luxembourg (LU)

( * ) Notice: Subject to any disclaimer, the term of this patent is extended or adjusted under 35 U.S.C. 154(b) by 52 days.

(21) Appl. No.: 16/072,384

(22) PCT Filed: Jan. 23, 2017

(86) PCT No.: PCT/EP2017/051334
§ 371 (c)(1),
(2) Date: Jul. 24, 2018

(87) PCT Pub. No.: WO2017/129528
PCT Pub. Date: Aug. 3, 2017

(65) Prior Publication Data
US 2019/0032803 A1 Jan. 31, 2019

(30) Foreign Application Priority Data
Jan. 25, 2016 (LU) .......................................... 92958

(51) Int. Cl.
*F16K 31/122* (2006.01)
*F16K 17/08* (2006.01)
*F16K 15/18* (2006.01)

(52) U.S. Cl.
CPC .......... *F16K 17/082* (2013.01); *F16K 15/186* (2013.01)

(58) Field of Classification Search
CPC ............................ F16K 17/082; F16K 15/186
(Continued)

(56) References Cited

U.S. PATENT DOCUMENTS 1,402,016 A * 1/1922 Ward .................... F04B 49/225
137/492.5
2,727,529 A * 12/1955 Gustav .................. F16K 17/082
137/469

(Continued)

FOREIGN PATENT DOCUMENTS

DE 8301494 U1 2/1986
EP 1120590 A2 1/2001
GB 751393 A 6/1956

OTHER PUBLICATIONS

International Search Report for corresponding PCT/EP2017/051334 dated Apr. 6, 2017.

*Primary Examiner* — Minh Q Le
(74) *Attorney, Agent, or Firm* — Sandberg Phoenix & von Gontard PC (57) ABSTRACT

A valve for pressurized gas or chemical agent. The valve comprises: a body with: an inlet, an outlet, and a passage which connects the inlet with the outlet and which includes a seat]. The valve further comprises a sliding piston able to engage with the seat in order to close the passage and a telescopic extension sliding against the passage in order to guide the piston in the passage at least between the open position and the closed position. The pressure difference between opposite faces of the piston pulls away the piston and the telescopic extension from the seat in order to open the passage, the passage remaining closed under pressure equilibrium. Additionally, a fire extinguishing system.

19 Claims, 9 Drawing Sheets

(58) Field of Classification Search
USPC ..... 137/491, 315.33, 492.5, 493.8, 511, 514,
137/535, 625.67, 616.3; 251/321, 347,
251/348, 346
See application file for complete search history.

(56) References Cited

U.S. PATENT DOCUMENTS

| | | | | |
|---|---|---|---|---|
| 3,173,441 | A * | 3/1965 | Elbogen | F16K 17/32 |
| | | | | 137/220 |
| 3,265,303 | A * | 8/1966 | Harris | G05D 23/126 |
| | | | | 236/80 R |
| 3,515,165 | A * | 6/1970 | Zadoo | G05D 16/2093 |
| | | | | 137/220 |
| 3,747,626 | A * | 7/1973 | Valentino | F16K 15/18 |
| | | | | 137/102 |
| 3,862,738 | A | 1/1975 | Stumpmeier | |
| 4,418,839 | A * | 12/1983 | Nichols | B67D 7/301 |
| | | | | 137/486 |
| 4,520,843 | A | 6/1985 | Debrunner, Jr. | |
| 4,616,672 | A * | 10/1986 | Schmidt | F16K 17/0433 |
| | | | | 137/107 |
| 9,371,927 | B1 * | 6/2016 | Lattimer | F16K 17/0466 |
| 2004/0089347 | A1 * | 5/2004 | Cavagna | F16K 17/10 |
| | | | | 137/491 |
| 2012/0285551 | A1 * | 11/2012 | Lewandowski | F16K 15/063 |
| | | | | 137/15.19 |
| 2015/0122353 | A1 * | 5/2015 | Chiba | F16K 47/02 |
| | | | | 137/535 |
| 2015/0198257 | A1 * | 7/2015 | Kelm | F04B 27/1804 |
| | | | | 137/512 |
| 2019/0072195 | A1 * | 3/2019 | van Schoor | F16K 17/04 |

\* cited by examiner

FIG. 9 ized gas, comprising: a body with: an inlet, an outlet, and a passage which connects the inlet with the outlet and which includes a seat; and a sliding piston with two opposite faces, which is able to engage with the seat in order to close the passage; the valve being adapted in such a way that a differential pressure on opposite faces of the piston pulls away the piston from the seat in order to open the passage; wherein the piston is equipped with a telescopic extension sliding against the passage in order to guide the piston in the passage at least between the open position and the closed position.

HIGH PRESSURE VALVE WITH TELESCOPIC PISTON

CROSS-REFERENCE TO RELATED APPLICATIONS

The present invention is the US national stage under 35 U.S.C. § 371 of International Application No. PCT/EP2017/051334, which was filed on Jan. 23, 2017, and which claims the priority of application LU 92958 filed on Jan. 25, 2016, the content of which (text, drawings and claims) are incorporated here by reference in its entirety.

FIELD

The invention is directed to a valve opened by the fluid pressure. More particularly, the invention is directed to a valve for a high pressure gas. The invention is also directed to a fire extinguishing system with a valve.

BACKGROUND

Prior art patent document published U.S. Pat. No. 3,862,738A discloses a shutoff valve comprising a passageway with a seat, and a perforated valve piston urged against with said seat by means of a spring. The passageway exhibits a pressure balancing chamber, the valve piston being arranged between the seat and the balancing chamber. A three way pilot valve connects the exhaust to the pressure balancing chamber in order to reduce the pressure therein. In such a way, the fluid pressure opposing the spring action moves the valve piston in order to open the shutoff valve. The latter operates in both ways, however this design remains bulky. More specifically, increasing the outlet diameter requires to increase the valve height.

SUMMARY

The invention aims at providing a valve solving at least one of the problems stated in the prior art. The invention has for technical problem to improve the compactness of a valve. The invention also aims at providing a cost saving solution which also prevents leakage.

The invention is directed to a valve, notably for pressurized gas, comprising: a body with: an inlet, an outlet, and a passage which connects the inlet with the outlet and which includes a seat; and a sliding piston with two opposite faces, which is able to engage with the seat in order to close the passage; the valve being adapted in such a way that a differential pressure on opposite faces of the piston pulls away the piston from the seat in order to open the passage; wherein the piston is equipped with a telescopic extension sliding against the passage in order to guide the piston in the passage at least between the open position and the closed position.

According to various embodiments, the piston slides within the telescopic extension, preferably the telescopic extension is essentially a tube around the piston.

According to various embodiments, the piston comprises a sealing element at the sliding interface with the telescopic extension, the sealing element is arranged at the level of the outlet when the piston is in the closed state, preferably the distance X between the sealing element and the seat is smaller than the outlet height Y.

According to various embodiments, the piston comprises a through hole in fluid communication with the inlet, preferably the valve comprises a pin closing the through hole when the piston is in the open position more preferably the pin is mounted on a handwheel, and/or the position of the pin is tunned by a handwheel.

According to various embodiments, in the closed position, the piston is mainly or essentially arranged at the level of the outlet; preferentially arranged within the extension and/or within the continuation of the outlet inner surface.

According to various embodiments, the piston comprises an upper portion sliding against the inner surface of the extension, the upper portion sliding along the majority of, or essentially the whole length of the extension.

According to various embodiments, the piston comprises a conical portion, preferably with a hollow base arranged toward the seat.

According to various embodiments, the inner diameter of the outlet is equal to or greater than the length of the piston measured between the seat and the upper face of the piston, preferably the piston diameter is at least 50 mm, preferably at least 75 mm.

According to various embodiments, the passage comprises a chamber with two halves, for example a first half connecting the inlet with the outlet and wherein the piston stands in the closed position; and a second half where the piston stands in the open position.

According to various embodiments, the body comprises an axial abutment intended to contact the telescopic extension when the piston is in the closed position, preferably the axial abutment is situated at the level of the outlet.

According to various embodiments, the valve comprises a resilient member urging the piston in the closed position, preferably the valve is arranged in such a way that the pressure at the inlet urges the extension toward the seat, notably the pressure at the inlet urges the extension against the axial abutments.

According to various embodiments, the telescopic extension comprises a portion shutting at least partially the outlet when the piston is in the closed position.

According to various embodiments, the valve comprises a vent connected to the passage in order to create a pressure drop in the passage in order to open the piston, preferentially the vent comprises a pilot device.

According to various embodiments, the passage comprises a release chamber with an upper bottom, preferably the release chamber is situated on the opposite of the seat with respect to the piston, preferably the piston and/or the extension abuts the upper bottom in the open state.

According to various embodiments, the piston comprises a closing surface which is perpendicular to the closure and to the opening motions.

According to various embodiments, the piston comprises a sealing part engaging with the seat; preferably the piston comprises a support maintaining the sealing part.

According to various embodiments, the piston is essentially hollow and/or tubular.

According to various embodiments, the extension comprises a sealing piece spaced from the gas outlet with respect to the sliding direction, preferably in the closed state at least one or each sealing piece of the telescopic extension is remote from the piston.

According to various embodiments, the axial abutment forms at least a semi-circle; preferably the axial abutment is flat, and/or cut by the gas outlet.

According to various embodiments, the outer diameter of the piston is greater than its length.

According to various embodiments, the inner and/or outer diameter of the extension is greater than its length.

According to various embodiments, the sliding stroke of the piston is greater than the extension length and/or greater than the half of its own length.

According to various embodiments, the extension comprises a tight wall around the piston in order to close tightly the passage in combination with the piston.

According to various embodiments, the first half of the chamber is a lower half, and/or the second half of the chamber is an upper half.

According to various embodiments, in the closed state the extension projects over both halves, preferentially the extension is axially centred in the passage chamber.

According to various embodiments, the extension forms an annular interface between the piston and the passage preferably a tight and moving interface; and/or the telescopic extension is a sliding guide.

According to various embodiments, the piston generally comprises a constant outer diameter, preferably its outer diameter changes of less than 15%, more preferably less than 5%.

According to various embodiments, the body comprises an integrally formed portion comprising the passage, the inlet and the outlet.

According to various embodiments, in the opened state, the piston and/or the extension are axially remote from the outlet level.

According to various embodiments, the piston is longer than the telescopic extension.

According to various embodiments, the handwheel is adapted to move the pin axially with respect to the body, preferably between a discharge position and a filling position.

According to various embodiments, the valve comprises an upper lid with a substantially free and/or flat upper surface.

According to various embodiments, the lid comprises an embossment, where the pilot device is optionally fixed.

According to various embodiments, the passage includes an inner surface connecting the inlet with the outlet, the sliding extension sliding against the inner surface.

According to various embodiments, the telescopic extension extends and/or increases the length of the piston along the sliding direction of the piston.

According to various embodiments, the telescopic extension is a telescopic lengthening, and/or as sliding lengthening, and/or a sliding extension, notably sliding against the piston.

According to various embodiments, the valve is free of handwheel.

The invention is also directed to a fire extinguishing system comprising a fluid storage, notably a gas cylinder, with a high pressure fire extinguishing fluid; and a valve; wherein the valve is in accordance with the invention; preferably the fire extinguishing fluid is a gas or gas mixture.

The invention is particularly interesting in that it provides a compact design. The height of the valve body above the outlet is reduced, and independent from the diameter of the outlet. This implies a weight reduction and costs savings. The valve may be integrated in narrower place of a fire extinguishing system. The length of the piston is not dictated by the inner diameter of the outlet, which has to be swept in order to ensure a full opening. In various instances, the piston may be provided with several extensions, and arranged in a telescopic cylinder manner.

The invention keeps reliable. It is actuated by the inlet gas pressure, the pressure maintaining the piston and the telescopic extension in the open state. The valve is stable by discharge and during refilling. Since the telescopic extension is autonomous, it does not require to be pulled by the piston. This prevents wear. The invention also reduces the weight of the piston. In this way the opening becomes faster and more reliable. The invention is of first interest for wide valve passages with pressures of 42 bars for instance.

DESCRIPTION

In the following description, the height and the length are measured along the sliding direction of the piston, also called axial direction. The levels are considered with respect to the sliding direction. The up side is considered in accordance with the lift direction of the piston from the seat, the down side is toward the closing direction. The lateral direction is perpendicular to the sliding direction.

Figure 1:
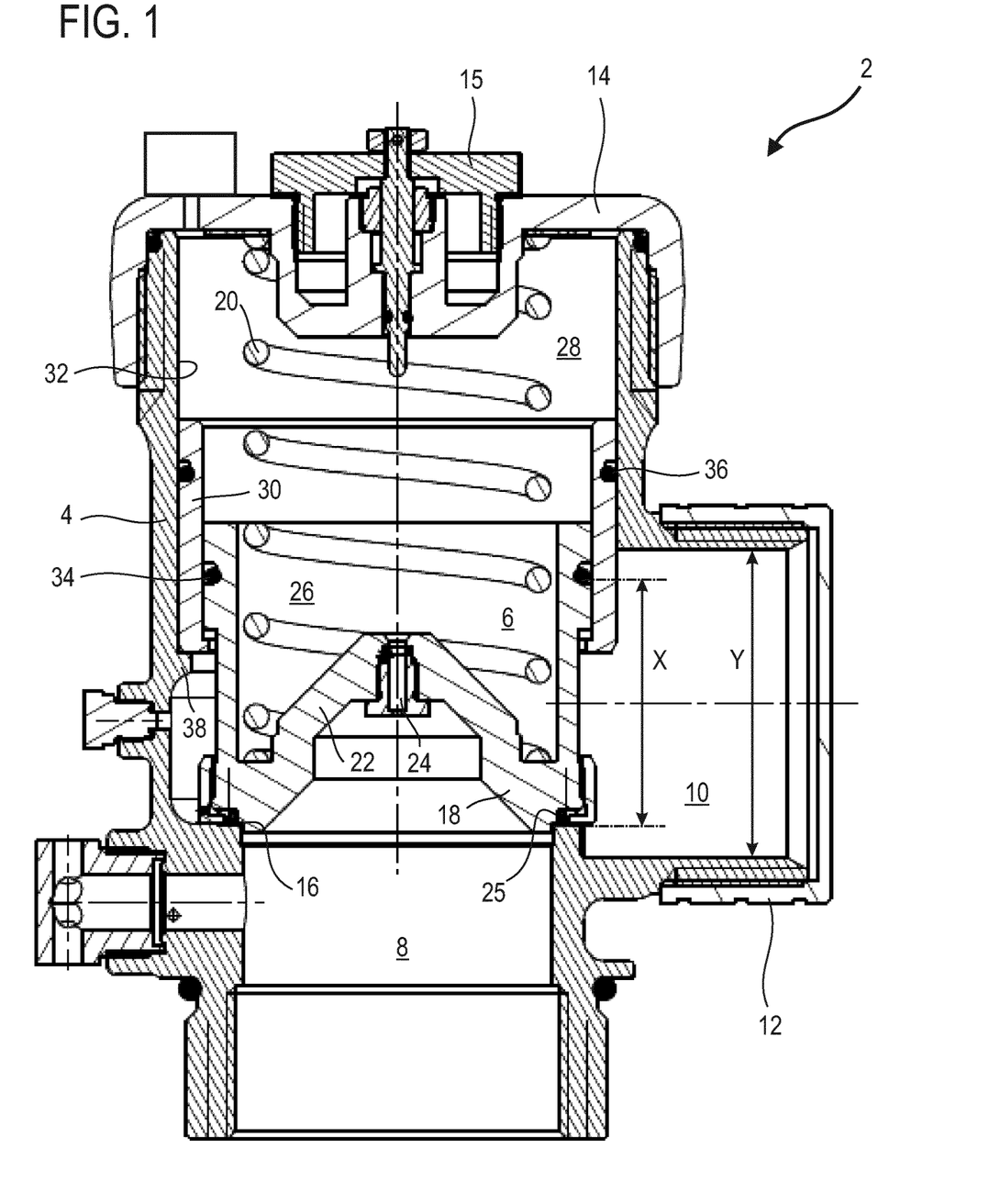
FIG. 1 is a sectional view of a valve in accordance with various embodiments of the invention, the valve being in a shut-off state and ready for discharge.
Figure 2:
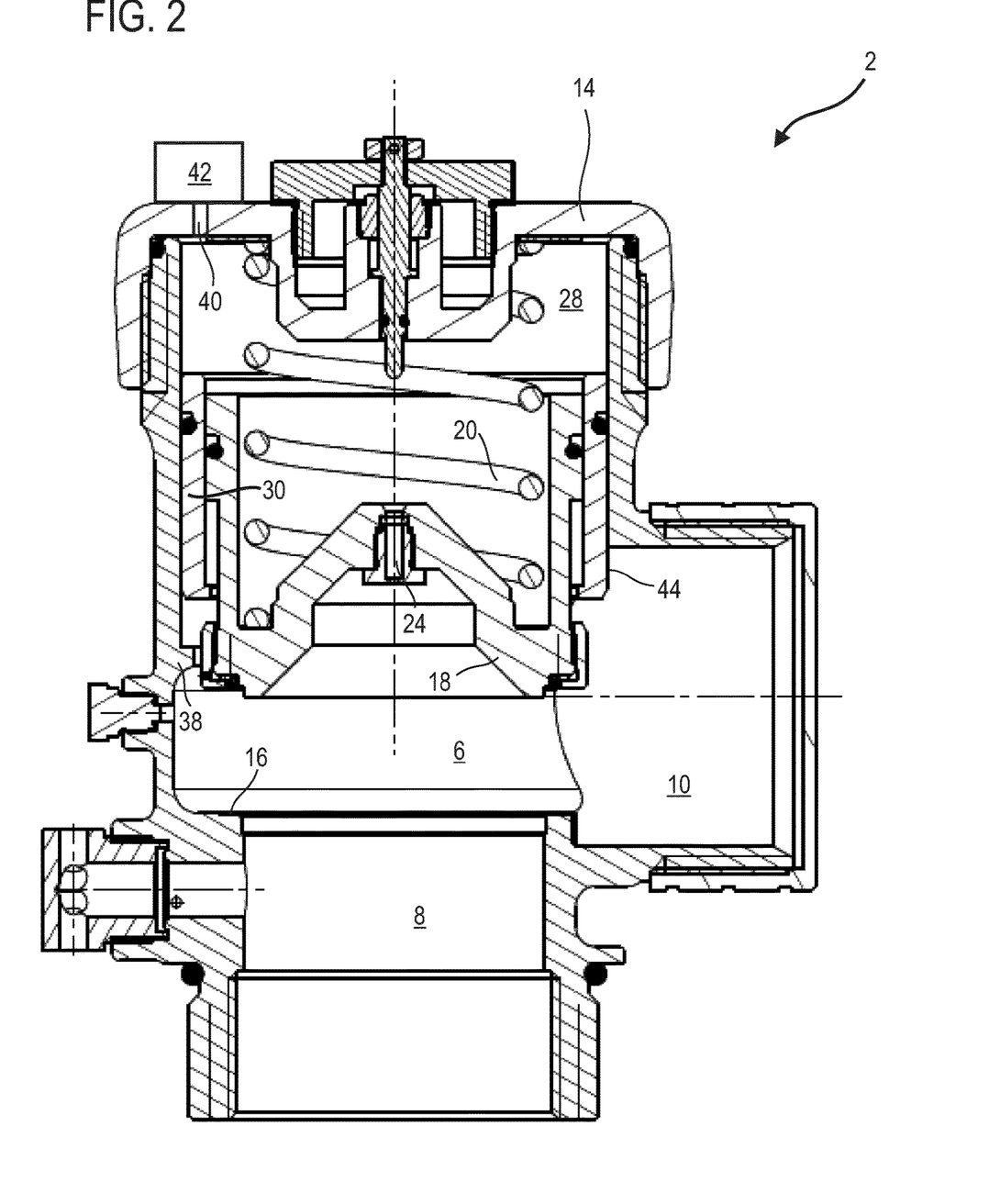
FIG. 2 is a sectional view of the valve of FIG. 1, wherein the valve is in an intermediate state during discharge, according to various embodiments of the invention.
Figure 3:
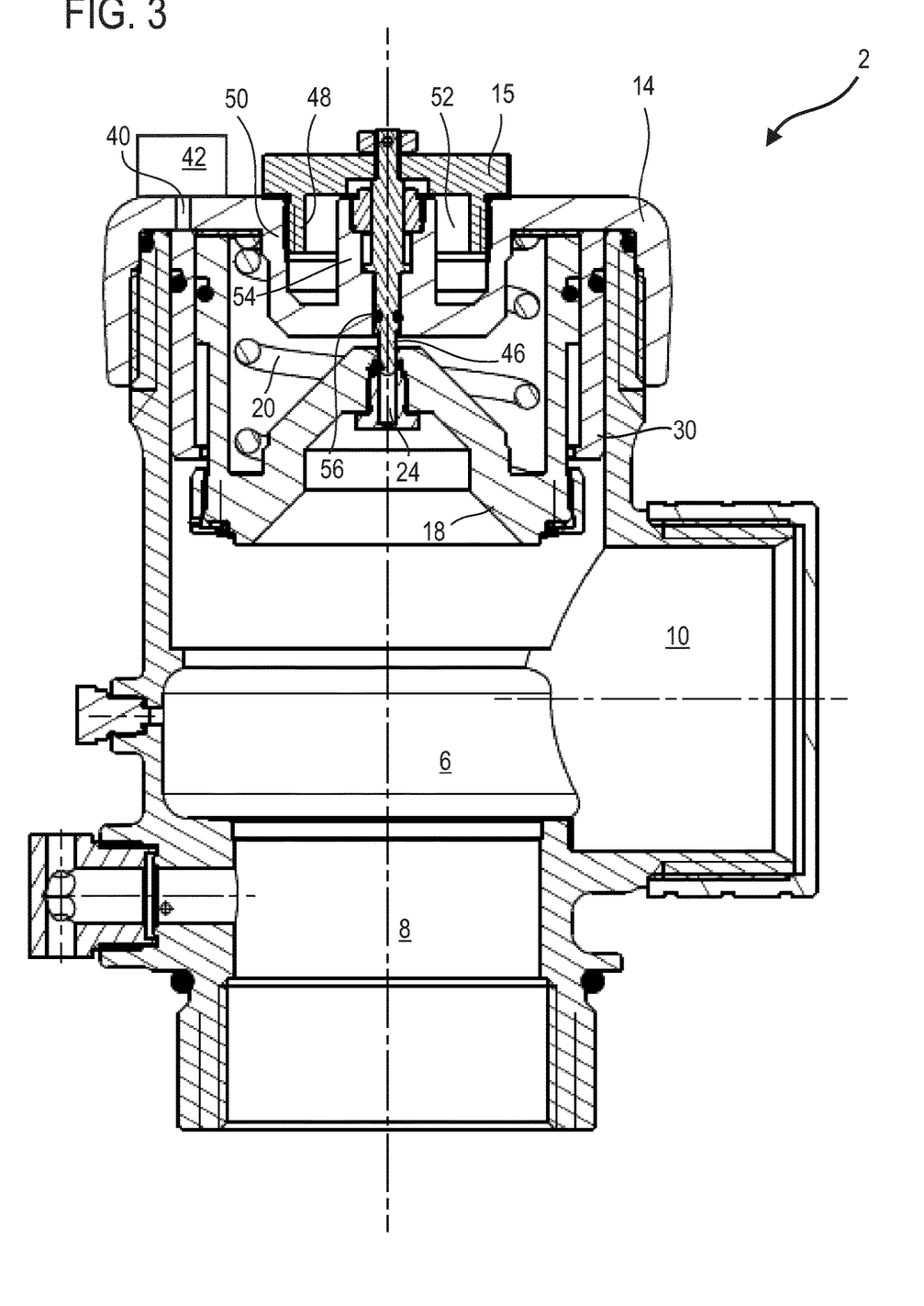
FIG. 3 is a sectional view of the valve of FIGS. 1 and 2, the valve being in an open state during discharge, according to various embodiments of the invention.

FIGS. 1, 2 and 3 are sectional views of a valve during discharge. FIG. 1 illustrates the valve 2 in a shut-off state whereas FIG. 3 illustrates the valve in an open state. FIG. 2 illustrates the valve 2 in an intermediate state; between the closed state and the open state.

As visible in FIG. 1, the valve has a main body 4 with a cylindrical shape. It is essentially hollow, and can be tubular. The body 4 includes a passage 6 connecting the inlet 8 to the outlet 10. The body 4 can be manufactured of metal, as brass or a brass alloy for instance. The valve 2 can comprise an upper cap 14 closing the passage 6. The upper cap 14 can include several devices 15, notably a handwheel 15. The handwheel 15 can be arranged in central position of the upper cap 14.

The inlet 8 is arranged downward, at the lower end of the valve. The outlet 10 is arranged laterally and perpendicularly to the opening direction of the valve 2. There, the outlet 10 is dotted with a cap 12 which is removed when the valve is assembled in a fire extinguishing system. The inlet 8 and the outlet 10 both show an inner tubular surface. Their inner diameters can substantially be equal. Other apertures can be provided in the body, each of them can be closed with a plug.

The valve 2 is a lift valve, it comprises a seat 16 closed by a piston 18. The valve is opened by lifting the closure member 18 from the seat 16. The piston 18 comprises a lower face intended to engage with the seat 16, and an upper face opposed to the lower face and which faces the upper cap 14. The faces are considered with respect to the sliding direction of the piston. A resilient member 20, as a coil spring 20, maintains the piston in the closed state. The resilient member 20 projects between the piston 18 and the upper cap 14, and can be preloaded. The piston 18 essentially has a cylindrical shape or tubular shape since it is hollow. It can include a tubular outer wall and a lower wall. The latter can comprise a conical portion 22, optionally hollow. The inner diameter of the piston 16 is generally equal to the inner diameter of the inlet 8, in various instances the diameter difference is less than 20%, for example less than 10%.

The piston 18 can comprise a through hole 24, for instance across the top of the conical portion 22. The through hole 24 affords pressure equilibrium between the opposed faces of the piston 18, and between the inlet 8 and the upper portion of the passage 6. The piston can carry a sealing part 25 in contact with the seat 16 in order to improve the sealing and to reduce the leaks between the inlet 8 and the outlet 10. The through hole is not an essential feature, for instance the resilient member can be preloaded enough for maintaining the piston in the closed position.

The passage 6 can comprise a chamber, optionally a main chamber in the body 4. The chamber can essentially be cylindrical and project along the opening direction of the piston. The chamber can comprise two halves, for example a first half 26 and a second half 28, for instance a lower half 26 and an upper half 28 respectively. The latter can be a release chamber 28. The first half 26 starts from the inlet 8, in various instances from the seat 16, and projects along the outlet 10. The piston 18 can mainly be within the first half 26 in its closed position. The second half 28 extends from the upper cap 14 and ends before the outlet 10. The piston 18 can essentially stand outside the second half 28 in the closed state.

The valve also comprises a telescopic extension 30 equipping the piston 18. In the closed state, the telescopic extension 30 is extended, or stretched out from the piston 18, so as to increase the length of the later along its sliding direction. The telescopic extension 30 projects axially from the piston 18. The telescopic extension 30 can slide with respect to the piston 18 and to the passage 6. It can slide against the inner surface 32 of the chamber. The telescopic extension is represented radially outside the piston, it is however practicable to arrange it radially inside the piston.

The piston 18 and the telescopic extension 30 can both comprise seals (34; 36), ring seals for instance that are arranged in outer annular groves. The piston 18 comprises a seal element 34 in tight contact with the telescopic extension 30 and sliding therein. The telescopic extension 30 is dotted with a sealing piece 36 sliding against the chamber inner surface 32, and cooperating therewith in a tight fashion. The piston 18, the telescopic extension 30 and the seat 16 form a shut-off device tightly shutting the passage 6 in the closed state. The piston 18 can close the passage alone or in combination with the telescopic extension 30.

The body 4 can comprise an abutment 38, engaging axially with the telescopic extension 30 in the closed state. There, the telescopic extension 30 can be equally shared between the halves (34; 36). It can form an arcuate bead protruding from the inner surface 32. The abutment 38 forms an opened loop, which is interrupted by the outlet 10. In the closed state, the inlet pressure acts on the telescopic extension 30, and pushes it against the axial abutment 38.

The valve 2 can be used with a gas or with a liquid, for instance a wet chemical agent. The fluid can be a gas mixture, eventually with liquid droplets. The valve inlet can be in fluid communication with a fluid storage in order to form a fixed fire extinguishing system. The fluid storage can be a tank or a gas cylinder comprising a fire extinguishing fluid. The latter can be at a pressure comprised between 10 bars and 100 bars, in various instances between 40 bars and 50 bars.

FIG. 2 shows the valve 2 in the intermediate state. The upper cap 14 can comprise a vent 40 in communication with the passage 6, in various instances with the second half 28. The vent 40 can become in fluid communication with the environment of the valve 2, which is in various instances at the atmospheric pressure, roughly 1 bar. A pilot device 42, for instance a pilot valve, opens the vent 40 by means of an actuator.

The pilot device 42 can be electrically piloted. It can act directly or indirectly. The pilot device 42 can be an electromagnetic valve, which opens when it is electrically powered, and which remains closed without power. The pilot device 42 can comprise a permanent magnet. It can be bistable. The pilot device 42 changes of position in response to an electric power supply, and remains stable in each position even when the power supply is off. Then, the valve can be kept open without external electric power, independently from a closing pin 46. Then, the risks linked to the heating phenomenon of the pilot device 42 are avoided.

Then, a pressure drop is triggered. The piston 18 is then subjected to a pressure difference, for instance of at least 40 bars due to the inlet pressure. This differential pressure implies a mechanical load overcoming the effect of the resilient member 20. The inner diameter of the through hole 24 allows to control the flow therethrough under pressure difference. By way of consequence, the piston moves away from the seat 16 and the valve 2 becomes opened. Since the telescopic extension 30 is subjected to the same pressure difference, it also moves toward the cap 14. It leaves the abutment 38, and its outer surface 44 progressively opens the outlet 10.

FIG. 3 illustrates the valve 2 in the opened state. The telescopic extension 30 and the piston 18 are collapsed in each other. They are plated against the upper cap 14, compressing then the resilient member 20 thereon. The valve 2 is fully opened. The telescopic extension 30, as the piston 18, is away from the outlet 10. This ensures a broad passageway between the inlet 8 and the outlet 10. This effect is interesting in that it affords a maximum flow, and reduces the pressure losses. In a fire extinguishing system, this improves the safety by fostering the maximal flow of a fire extinguishing fluid at a given inlet pressure.

Moreover, the upper cap 14 can support the pin 46 closing the through hole 24 arranged in the piston 18. Consequently, the fluid loss through the vent 40 is controlled. It is limited to the piston opening stroke. Further, this phenomenon is reliable and independent of the pilot device 42 or of its electrical powering.

The handwheel 15 is linked to the upper lid 14 by means of a threaded portion 48. This portion 48 engages with a corresponding portion 50 of the upper lid 14. The corresponding portion 50 encircles an annular space 52 receiving the threaded portion 48. In the opened state, the annular space 52 can be arranged inside the sliding piston 16 and/or inside the telescopic extension 30. The lid 14 can comprise a guiding portion 54 for the pin 46. It can be substantially tubular. It can enclose a seal ring 56 around the pin 46. The seal ring 56 can be directly in contact of the pin and of the upper lip 14. Alternatively, the seal ring can be carried by the pin. Turning the handwheel 15 affords to slide the pin 46 vertically, toward or away from the seat 24 by way of example.

During discharge, the gas pressure decreases in the gas cylinder. The corresponding mechanical force acting against the lower face of the piston 18 also reduces. The pressure will decrease until the mechanical force exerted by the resilient member 20 overcomes the force of the pressure. Then, the resilient member 20 will push the piston 18 downward, toward the seat 16. The piston 18 will be in the closed state, as illustrated in FIG. 1. The valve 2 can be configured in order to close the piston 18 when the pressure falls to 2 or 3 bars. This means that the valve 2 shuts-off before it is empty. This phenomenon is of prior interest since it keeps a residual pressure in the gas cylinder. It prevents impurities from entering in the gas cylinder. Remaining gas, for instance NOVEC, also protects the gas cylinder inner surface from corrosion.

Figure 4:
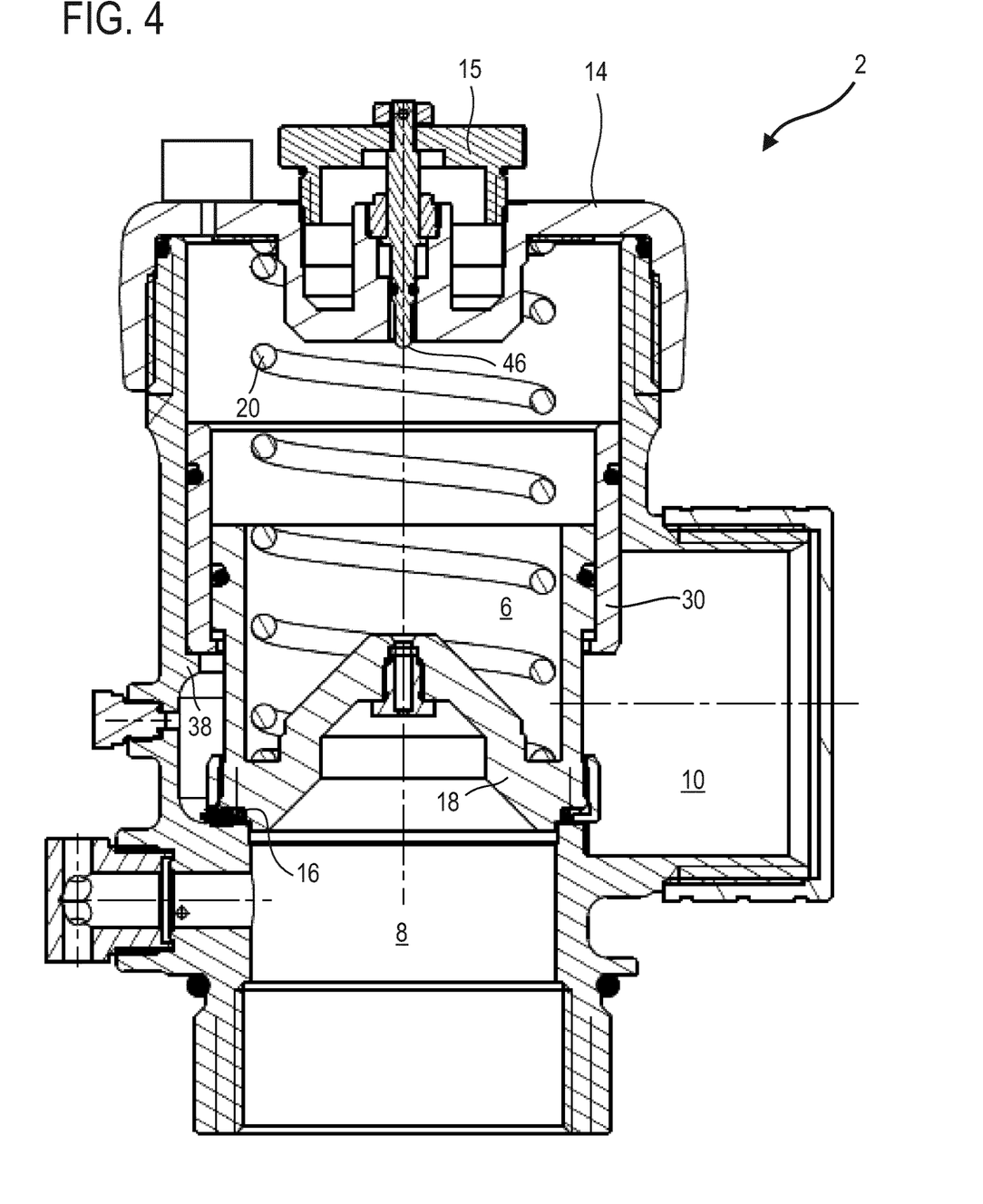
FIG. 4 is a sectional view of the valve of FIGS. 1 to 3, the valve being in a shut-off state and ready for filling, according to various embodiments of the invention.
Figure 5:
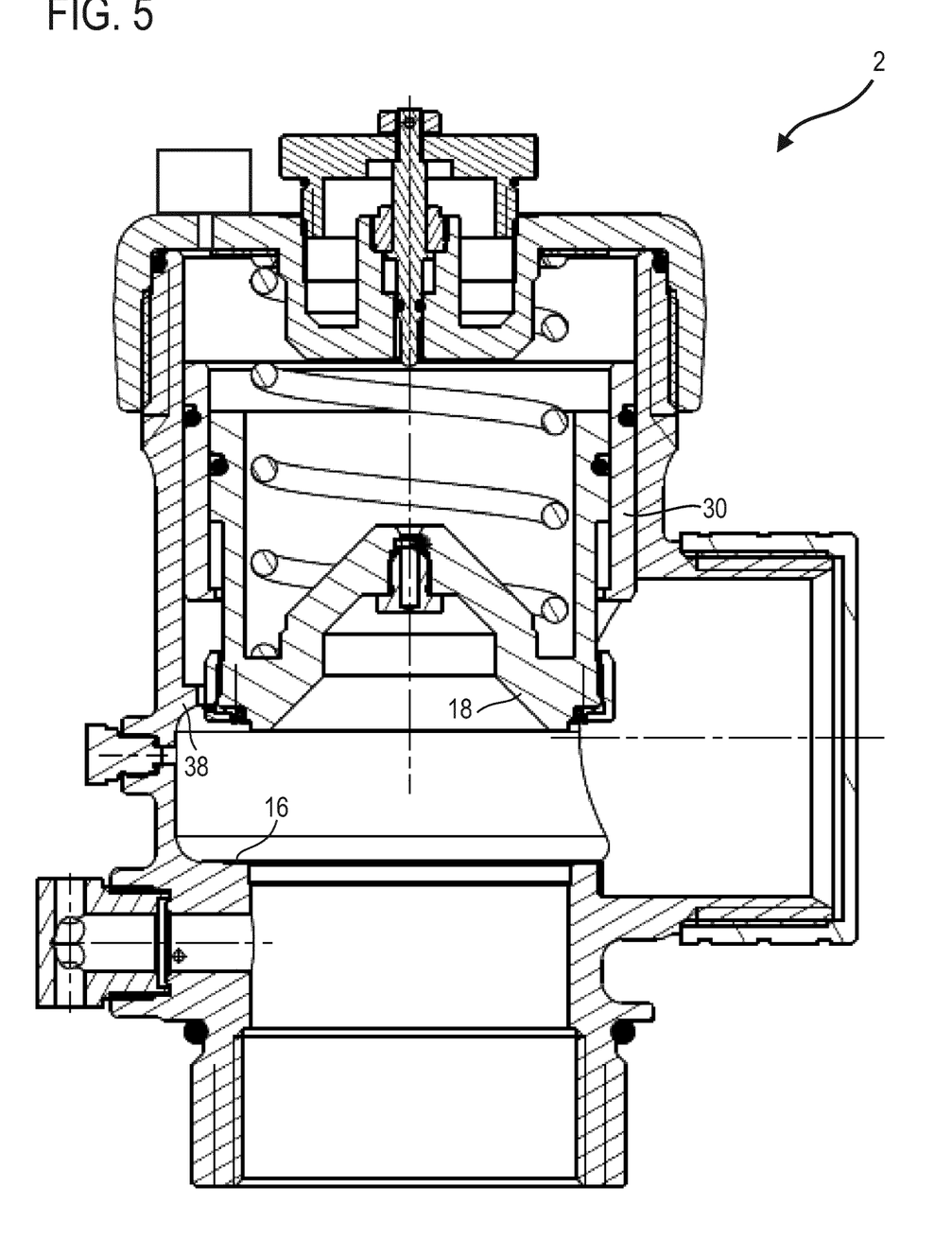
FIG. 5 is a sectional view of the valve of FIGS. 1 to 4, the valve being in an intermediate state during filling, according to various embodiments of the invention.
Figure 6:
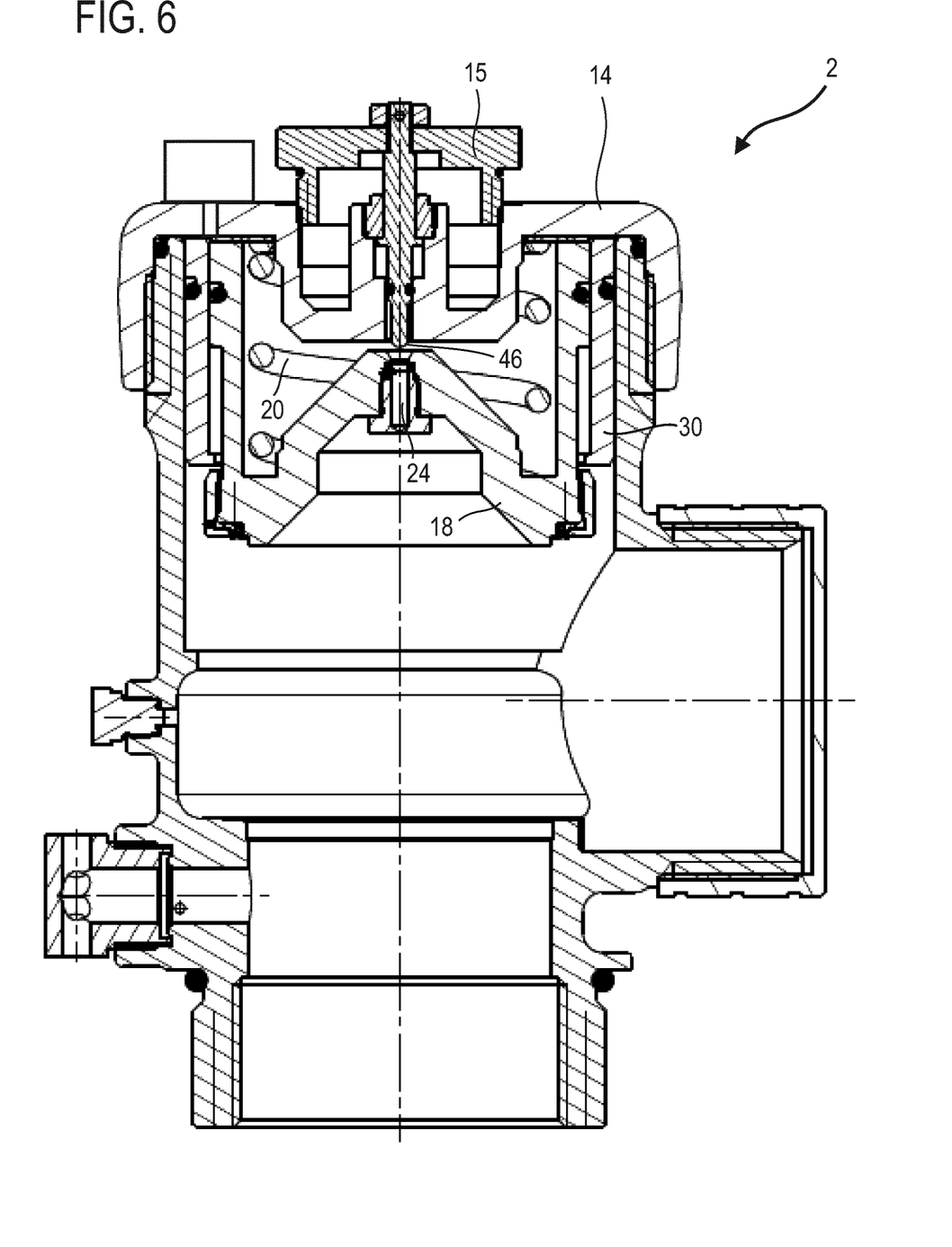
FIG. 6 is a sectional view of the valve of FIGS. 1 to 5, the valve being in an open state during filling, according to various embodiments of the invention.

The FIGS. 4, 5 and 6 illustrate the filling of the gas cylinder through the valve 2. In the filling state, the handwheel 15 carrying the pin 46 is raised. Then, the pin 46 is retracted within the cap 14.

During filling, the pressure at the outlet 10 is greater than the pressure at the inlet 8. As shown in FIG. 4, the pressure at the outlet 10 is greater than the pressure on the upper face of the piston 18 and on the telescopic extension 30. Since in the shut-off state the piston 18 and the telescopic extension 30 close the passage 6, a pressure difference applies on them. The pressure difference overcomes the force of the resilient member 20, and lifts the piston 18 from the seat 16. This also lifts the telescopic extension 30 from the axial abutment 38. The corresponding state is illustrated at FIG. 5. Due to dynamic pressure, the piston 18 and the telescopic extension 30 keep rising, and move upward.

As illustrated in FIG. 6, the piston 18 and the telescopic extension 30 are lifted until abutting against the cap 14. There, the pin 46 is remote from the piston 18, and more peculiarly from the through hole 24. The tip of the pin 46 remains away from the O-ring in the through hole 24 in order the keep open the fluid communication through the piston 18.

The filling is operated until the gas cylinder is full, or sufficiently filled. Then the pressure at the outlet 10 comes close to the pressure at the inlet 8. Since the filling flow through the passage 6 reduces consequently, the dynamic pressure acting on the piston 18 and on the telescopic extension 30 diminishes. It diminishes until the resilient member 20 overcomes the mechanical force of the dynamic pressure. Finally, the resilient member 20 closes back the piston 18 and the telescopic extension 30 as illustrated in FIG. 4. It is noteworthy that the filling can occur without electric power, it can be hand-controlled by means of the handwheel 15. After filling, an operator can actuate the handwheel 15 in order to sink the pin 46 at its lower position as drawn in FIG. 1. By now, the valve becomes ready for a new discharge.

Figure 7:
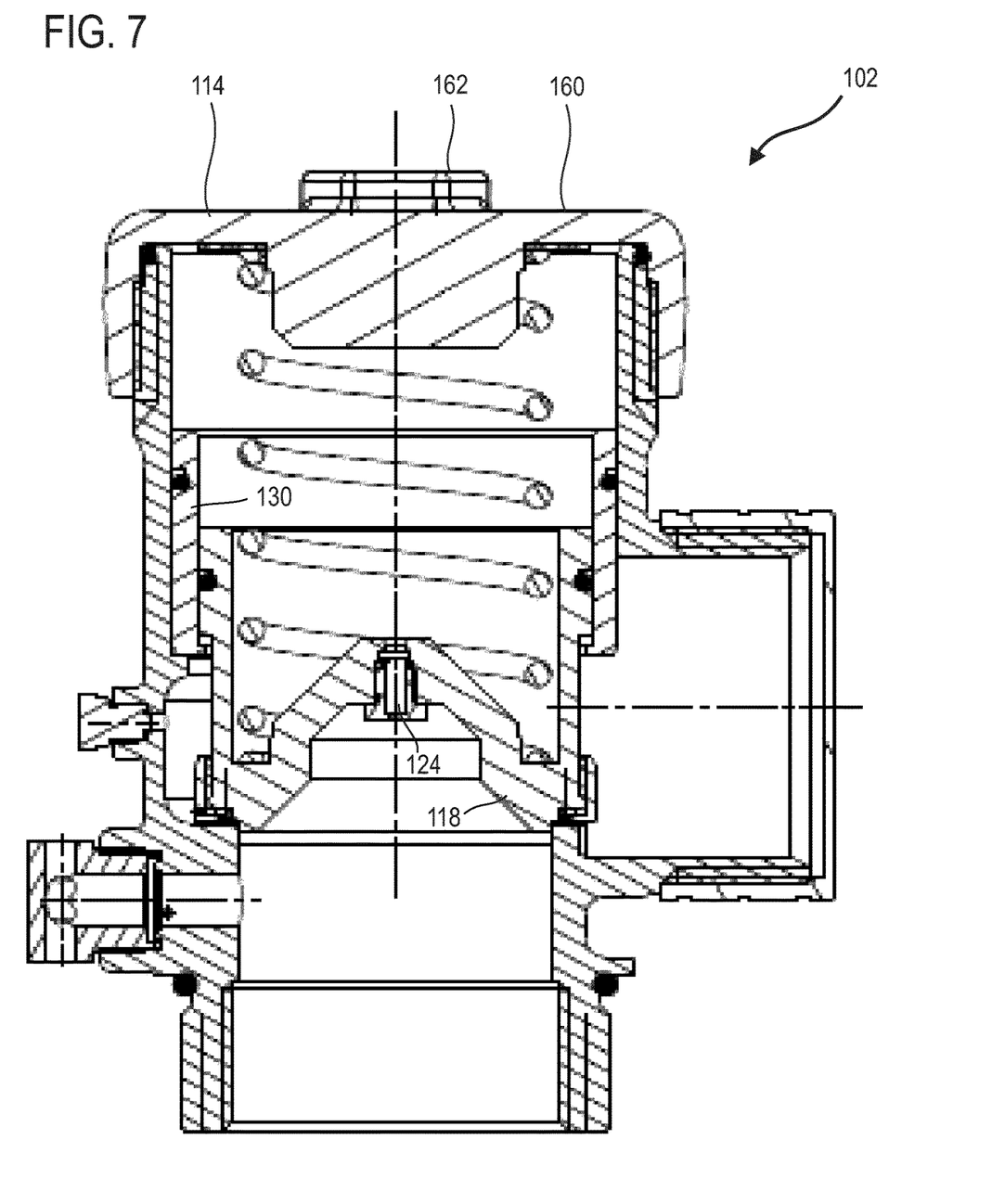
FIG. 7 is a sectional view of a valve in accordance with various other embodiments of the invention, the valve being in a shut-off state.
Figure 8:
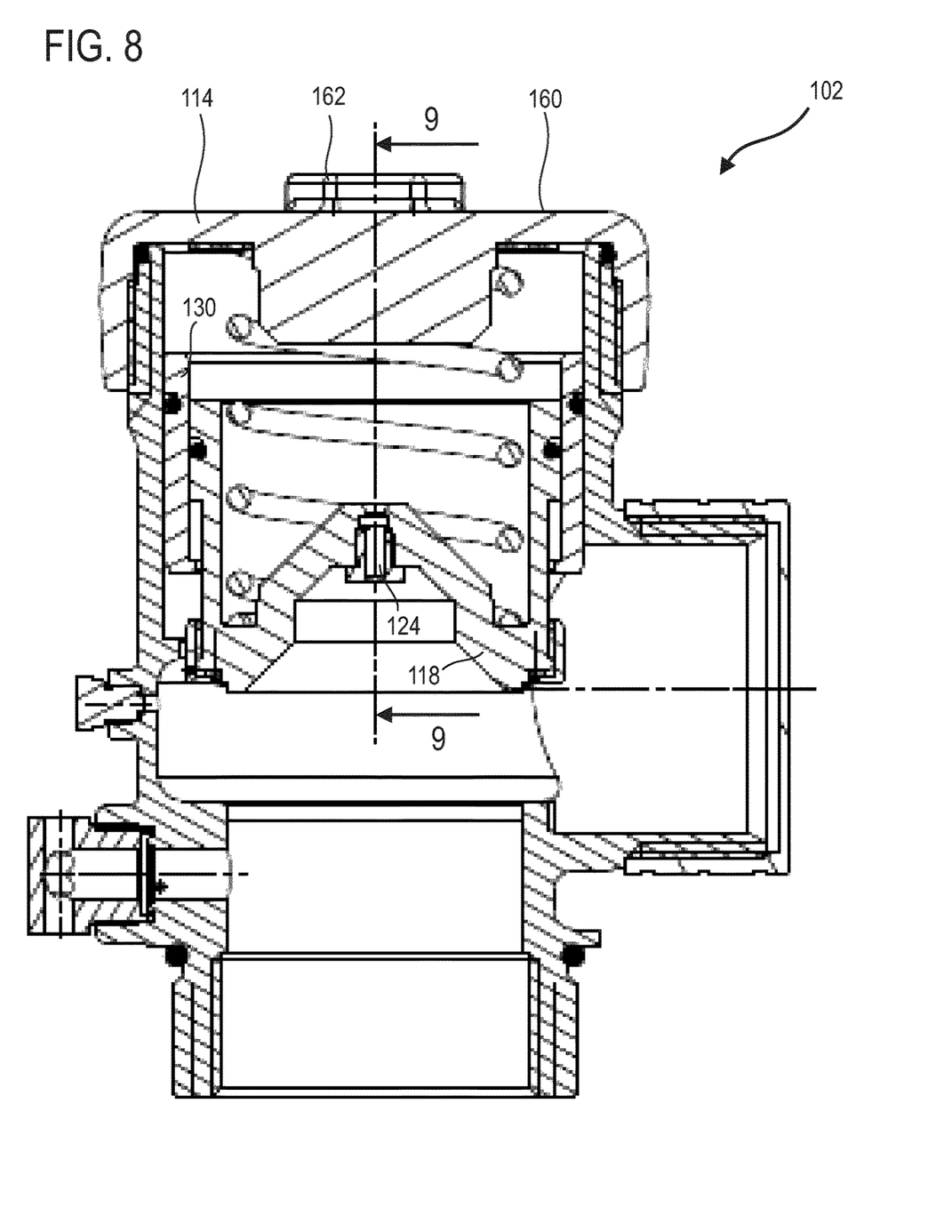
FIG. 8 is a sectional view of the valve of FIG. 7, wherein the valve is in an intermediate state, according to various embodiments of the invention.
Figure 9:
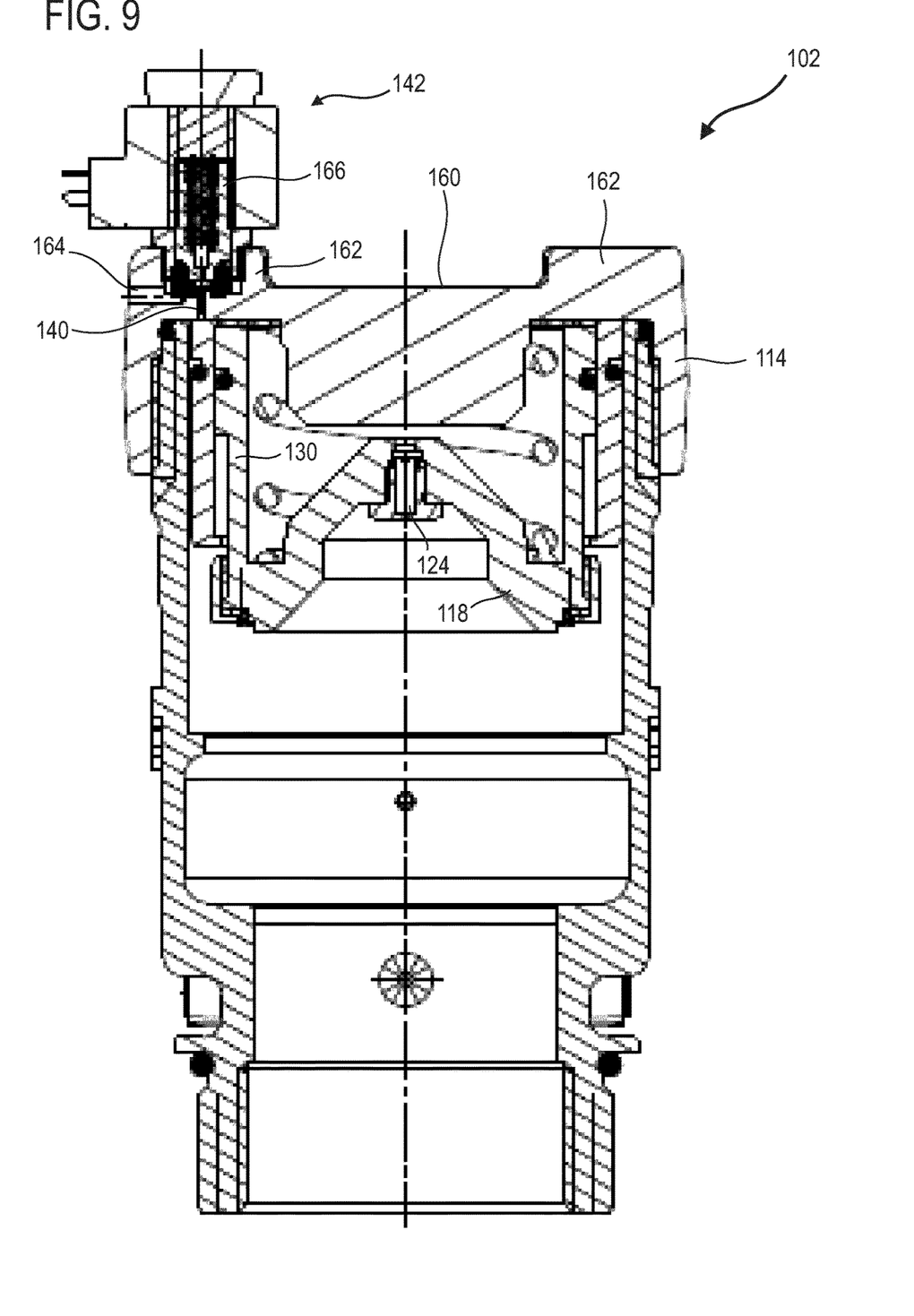
FIG. 9 is a sectional view of the valve along the axis 9-9 drawn in FIG. 8, the valve being in an open state, according to various embodiments of the invention.

FIGS. 7, 8 and 9 represent the valve 102 according to various other embodiments of the invention. These FIGS. 7, 8 and 9 keep the reference signs of the embodiments described above for identical or similar elements, the reference signs being increase of 100 however. Specific reference signs are used for the specific elements of this embodiment.

FIG. 7 represent the valve 102 in a closed state, FIG. 8 represents the valve 102 in an intermediate open state, and FIG. 9 represents the valve 102 in the open state. Each of the FIGS. 7, 8 and 9 can correspond to discharge or to filling. FIG. 9 is a sectional view taken along the axis 9-9 illustrated in FIG. 8 in order to expose the pilot device 142.

The second embodiment is similar to the first embodiment; it substantially differs in that the handwheel is removed from the upper cap 114. The pilot device 142 can replace the pin. It can maintain the pressure drop above the piston 118 by standing open. The position of the pilot device 142 has been turned of 90° with respect to the cap 114 central axis.

The cap 114 comprises an upper surface 160, also designated as outer surface 160, which is substantially free. The upper surface 160 can be generally flat. Yet, the cap 114 optionally shows two embossments 162 useful for assembling the cap 114. The central portion of the cap 114 is closed. Then, the valve 102 is essentially piloted by the pilot valve 142.

As appear in FIG. 9, the pilot device 142 can be situated on a border of the cap 114. Then, its exhaust 164 will be shorter.

The pilot device 142 can be arranged on the top of an embossment 162. It can also be fixed on a flat portion of the cap as well. The pilot device 142 can be a pilot valve. It can comprise a plunger 166 actuated by a magnetic field. The magnetic field can be produced by a magnetic coil (non illustrated) in order to pull away the plunger 166 from the vent 140. This upward move opens the vent 140 and triggers the opening move of the piston 118 and of the telescopic extension 130.

The through hole 124 can be kept. Optionally, the through hole is suppressed, its place is clogged. Then, the piston is tight. The cone portion can be replaced by a flat plate, essentially continuous. The piston can be free of through hole.

The invention claimed is:

1. A valve for pressurized gas, said valve comprising:
   a body with an inlet, an outlet, and a passage which connects the inlet with the outlet and which includes a seat; and
   a sliding piston with two opposite faces, that is designed and configured for cooperating with the seat in order to close the passage;
   the valve being designed and configured in such a way that a differential pressure on opposite faces of the piston pulls the piston away from the seat in order to open the passage,
   wherein the piston is provided with a telescopic extension sliding against the passage in order to guide the piston in the passage at least between an open position and a closed position.

2. The valve according to claim 1, wherein the piston is slidable within the telescopic extension, the telescopic extension forming a tube around the piston.

3. The valve according to claim 1, wherein the piston comprises a sealing element at a sliding interface with the telescopic extension, the sealing element arranged at the level of the outlet when the piston is in a closed state, a distance X between the sealing element and the seat is smaller than an outlet height Y.

4. The valve according to claim 1, wherein the piston comprises a through hole in fluid communication with the inlet, the valve comprises a pin closing the through hole when the piston is in the open position.

5. The valve according to claim 4, wherein the pin is mounted on a hand wheel.

6. The valve according to claim 1, wherein in the closed position, the piston is one of mainly or essentially arranged at the level of the outlet.

7. The valve according to claim 1, wherein the piston comprises an upper portion slidable against an inner surface of the extension, the upper portion being slidable along one of the majority of, or essentially the whole length of the extension.

8. The valve according to claim 1, wherein the piston comprises a conical portion with a hollow base arranged toward the seat.

9. The valve according to claim 1, wherein an inner diameter of the outlet is one of equal to or greater than a length of the piston measured between the seat and an upper face of the piston.

10. The valve according to claim 1, wherein the piston diameter is at least 50 mm.

11. The valve according to claim 1, wherein the passage comprises a chamber with two halves comprising a first half connecting the inlet with the outlet and wherein the piston stands in the closed position; and a second half where the piston stands in the open position.

12. The valve according to claim 1, wherein the body comprises an axial abutment configured for contacting the telescopic extension when the piston is in the closed position.

13. The valve according to claim 12, wherein the axial abutment is located at the level of the outlet.

14. The valve according to claim 12, wherein the valve comprises a resilient member structured and operable to urge the piston in the closed position, the valve is arranged in such a way that the pressure at the inlet urges the telescopic extension towards the seat against the axial abutments.

15. The valve according to claim 1, wherein the telescopic extension comprises a portion shutting at least partially the outlet when the piston is in the closed position.

16. The valve according to claim 1, wherein the valve comprises a vent connected to the passage in order to create a pressure drop in the passage in order to open the piston, the vent comprising a pilot device.

17. The valve according to claim 1, wherein the passage comprises a release chamber with an upper bottom, the release chamber being arranged on the opposite of the seat with respect to the piston, at least one of the piston and the telescopic extension abutting the upper bottom in the open state.

18. The valve according to claim 1, wherein the valve comprises an upper lid with a substantially free upper surface.

19. A fire extinguishing system comprising a fluid storage with a high pressure fire extinguishing fluid; and a valve; wherein the valve comprises:
- a body with an inlet, an outlet, and a passage which connects the inlet with the outlet and which includes a seat; and
- a sliding piston with two opposite faces, which is designed and configured for cooperating with the seat in order to close the passage;
- the valve being designed and configured in such a way that a differential pressure on opposite faces of the piston pulls away the piston from the seat in order to open the passage,
- wherein the piston is equipped with a telescopic extension sliding against the passage in order to guide the piston in the passage at least between an open position and a closed position.

* * * * *